UNITED STATES PATENT OFFICE.

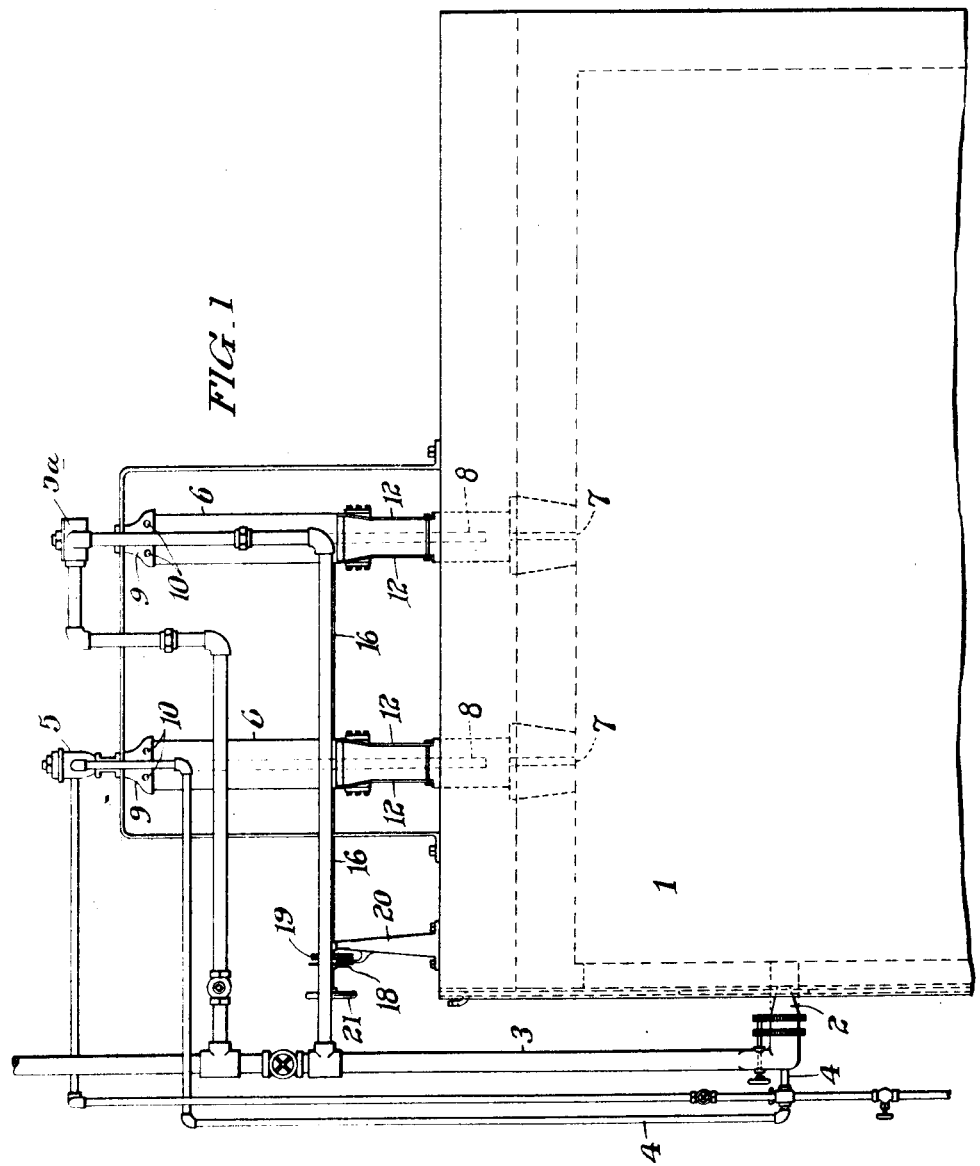

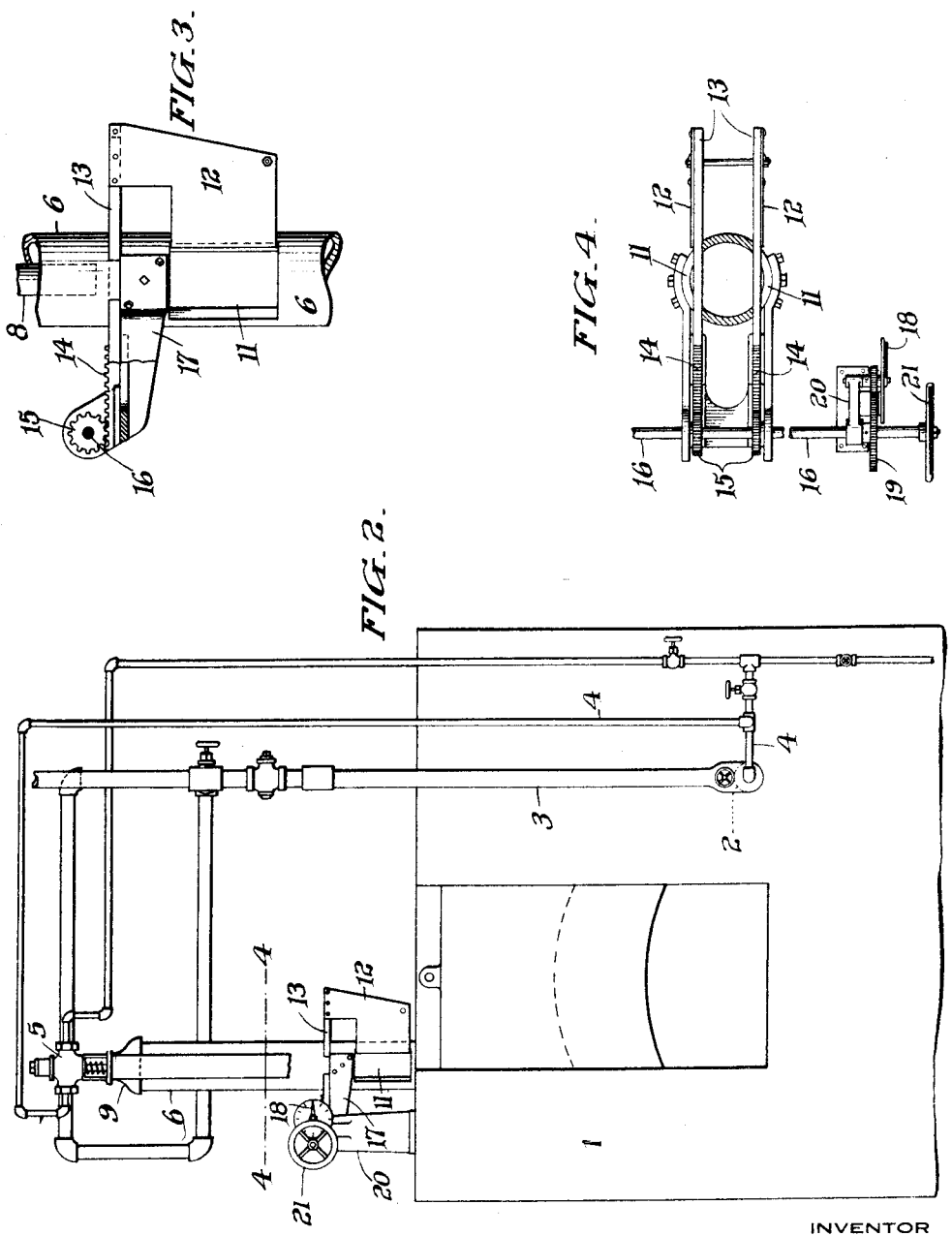

HARRY E. GILBERT, OF CONSHOHOCKEN, PENNSYLVANIA.

TEMPERATURE-REGULATOR FOR FURNACES.

1,177,859.　　　　　Specification of Letters Patent.　　Patented Apr. 4, 1916.

Application filed December 9, 1914. Serial No. 876,260.

*To all whom it may concern:*

Be it known that I, HARRY E. GILBERT, a citizen of the United States, and resident of Conshohocken, county of Montgomery, and State of Pennsylvania, have invented an Improvement in Temperature-Regulators for Furnaces, of which the following is a specification.

This invention relates to a control mechanism for thermostats when employed for regulating the fuel to furnaces, and consists of certain improvements which are fully set forth in the following specification and shown in the accompanying drawings which form a part thereof.

The object of the invention is to provide a controlling device for thermostatic elements, whereby the supplies of fuel and air may be automatically regulated and the temperature of a furnace may be maintained constant under all ordinary conditions according to requirements.

It has for a further object to provide an adjusting mechanism for the automatic control devices for the furnace whereby the normal desired temperature within the furnace may be insured and maintained.

My invention consists of mechanism for effectually carrying into operation the above recited objects, said mechanism being hereinafter described and more particularly defined in the claims.

Referring to the drawings: Figure 1 represents a side elevation of an apparatus embodying my invention shown in operative position upon a suitable furnace; Fig. 2 represents a front elevation of the same; Fig. 3 represents a more detailed side elevation of the control valve; and Fig. 4 represents a section on line 4—4 of Fig. 2.

1 designates the casing of a suitable furnace which receives the oil or gas for fuel under pressure by way of the nozzle 2 and supply pipe 3.

4 designates the air supply pipe for admitting air with the fuel to the furnace so that the proper combustive mixture is obtained. The fuel supply pipe 3 and the air pipe 4 are respectively controlled by thermostatically controlled valves 5 and 5ª, and in view of the fact that the regulating means for these two mediums is identical in construction, the description will be confined to one of the thermostatic controlled devices, and the same reference numerals will apply to the details of the other.

In the particular illustration of my invention, I have shown the fuel supply pipe 3 as intended for oil, but in referring to the fuel as oil it is to be understood that I include gas as an equivalent of the oil.

6 designates an upright tubular casing mounted upon the furnace casing 1 and having communication with the combustion chamber of the furnace through any suitable port 7. The casing 6 surrounds the thermostatic element 8 which by its expansion and contraction operates to automatically open and close the valve 5 for regulating purposes, as will be understood. The operating connections between this thermostatic element and the valve 5 are indicated only diagrammatically since they form no part of the present invention, and any type of transmitting means may be employed.

9 designates a closure for the outer end of the casing 6, the same being provided with suitable outlets 10 for the heated products which are by-passed from the furnace through the casing 6.

11 designates openings through the casing 6, said openings arranged diametrically opposite and preferably located adjacent to or near the point where the heated gases are admitted and slightly removed from the vicinity of the lower end of the thermostatic member 8.

12 designates slide valve members for respectively controlling the openings 11, the said valve members being, as here shown, fixed respectively to bars 13 which are guided in the walls of the casing 6 and terminate respectively in racks 14 which are in mesh with the operating pinions 15 upon the shaft 16, which is rotatably mounted in a frame extension 17 fixed to the casing 6 and provided with the hand wheel 21. The rotation of the shaft 16 and pinions 15 causes the bars 13 to be moved in one direction or the other and thus vary the position of the valve members 12 with respect to the openings 11.

18 designates an indicating mechanism suitably geared at 19 to the shaft 16, as shown, and adapted to be operated to indicate the extent of the movement given to the valves 12, so that the adjustment of the openings 11 may be accurately determined. This indicating mechanism is properly mounted upon a standard or like support 20 fixed to the furnace casing in a position where it may be easily read during the adjustment of the valves.

The shaft 16 may be made to adjust the valve devices of both thermostatic members as the temperature conditions to each thermostat should desirably be the same.

The device, in operation, is adapted to automatically control the supply of fuel and air to the furnace in regulated quantities according to the temperature in the combustion chamber. This is effected, as will be apparent, by the escape of a certain portion of the hot products through the ports 7 into the casings 6, where the temperature acts upon the thermostatic elements. If the temperature of these gases is below the normal, the thermostats contract, thus opening the valves 5 and 5ª and increasing respectively the supplies of oil and air, whereas if the temperature is above the normal the opposite result takes place and the valves are operated to cut down the supplies.

By providing the openings 11 in the casings 6 it is possible to vary the time of operation of the thermostat with respect to the temperature in the furnace and consequently a lower or higher temperature may be had as the desired constant temperature of the furnace. Thus, for example, with the valves 12 wide open the escape of gases from the casing 6 is at a maximum and reduces the temperature of the by-passed hot gases passing over the thermostats to a minimum by reducing the speed of circulation through the casing 6 and thereby the heat units in a given time acting upon the thermostats. If the valves 12 are closed, all of the furnace gases pass through aperture 7 passing upward and outward by the apertures 10, but whenever the valves 12 are partly open the hot gases escape from the openings 11 and to that extent check the rapidity of the upward rise of gases from the furnace and their action on the thermostat; and the greater the valves are opened the more the freedom for passage of hot furnace gas out of the casing through the opening 11 and a more retarding circulation thereby caused and a less heating of the thermostat. In this manner the temperature of the medium surrounding the thermostatic element 8 is made to increase or decrease according as to whether the valves 12 are closed or open to a greater or less extent, this adjustment being a manual one and when the proper temperature for the thermostatic element is secured the thermostatically operated valve 5 or 5ª will thereafter be operated by the respective thermostatic elements to maintain the temperature of the furnace constant or substantially constant. The closing of the valves 12 causes a lower temperature to be maintained in the furnace than when the valves are open to a greater extent, and when the valves are fully opened the highest temperature in the furnace is maintained.

By the employment of the apparatus thus described, there is capacity for automatic control of the fuel or heating medium and also the air delivered thereto for perfect combustion under accurate thermostatic control, the thermostats thereof being subjected to a slowly circulating heated atmosphere deriving its heat from the furnace though out of the direct circulation of the main high temperature products thereof, the supply of heated gases to the thermostat being more free than the escape of said gases from the top of said casings surrounding the said thermostats, whereby thermostats are affected by an atmosphere of heated gases of a temperature greatly less than that of the furnace and which changes in temperature are commensurate or relative with the changes of temperature in the furnace, to control the fuel and air supplied to the furnace; and said means further provides predetermined control of the speed of circulation or change of the heated atmosphere about the thermostats whereby the maximum temperature to be maintained may be established. It will thus be manifest that the high temperature of the furnace may be regulated without inserting the thermostatic elements into it, and this is so because the small portion of the gases which is allowed to pass through that portion of the casings containing the thermostatic elements is so governed that changes in its temperature are proportional to the temperature of the gases within the furnace itself. The thermostatic elements could not withstand the high temperature of the furnace itself but by my improvements it is enabled to accurately cause the regulation and maintenance of a constant temperature of the furnace without in the least endangering the thermostatic devices. In using the word "products" in connection with the heating gases passing to the thermostats, I have used it in a general sense as employing a heated medium deriving its heat from the furnace and conveying it to the thermostats without any restriction as to the real composition of the said gases as it is the heat and not the composition with which I am concerned, and therefore when I use the words "heated products of the furnace" I am doing so in a generic sense as including gaseous medium deriving its heat from the furnace. The result of this is to maintain a uniform predetermined maximum degree of heat in the furnace. Therefore, by adjusting the position of the valves 12 properly with respect to the openings 11, through the hand wheel 21 and its adjuncts, it is possible to obtain a very accurate furnace temperature, and automatically maintain such temperature.

I have shown my improved apparatus in the form which I have found excellently adapted for the purpose but I do not restrict myself to the details as these may be modified in various ways without departing from the spirit of the invention; for example, while the casing 6 is provided with the valves 12 at the lower portions thereof I do not restrict myself to this particular arrangement as any suitable arrangement may be provided wherein the said casing is furnished with outlets to the atmosphere and valve devices arranged to regulate the amount of the hot gases which circulate over the thermostatic elements.

Having now described my invention, what I claim as new and desire to protect by Letters Patent is:—

1. In a device of the character stated, a furnace combined with a plurality of casings each having communication with heated products of the furnace to provide for a circulation of a portion of the heated products through said casings, a fuel supply pipe leading to said furnace, a valve in said fuel supply pipe, a thermostatic element in one of said casings for controlling the operation of said valve, an air supply pipe leading to said furnace, a valve in said air pipe, a thermostatic element in the other casing for controlling said air supply valve, and means for permitting hot products in regulated quantities to pass from each of said casings before reaching the thermostatic element for varying the temperature of the heated products passing through said casings, whereby a predetermined temperature is obtained in said furnace.

2. In a device of the character stated, a furnace combined with a plurality of casings each having communication with a combustion chamber thereof to provide for a circulation of a portion of the heated products through said casings, and each of said casings being provided with an opening adjacent the furnace end thereof, a fuel supply pipe leading to said furnace, a valve in said fuel supply pipe, a thermostatic element in one of said casings for controlling the operation of said valve, an air supply pipe leading to said furnace, a valve in said air pipe, a thermostatic element in the other casing for controlling said air supply valve, valves for respectively controlling said openings in the casings, and means for varying the positions of said valves with respect to said openings whereby the circulation and temperature of the heated products passing through said casings is varied at will.

3. In a device of the character stated, a furnace combined with a plurality of casings each having communication with the furnace to provide for a circulation of a portion of the heated products through said casings and each of said casings being provided with an opening adjacent the furnace end thereof, a fuel supply pipe leading to said furnace, a valve in said fuel supply pipe, a thermostatic element in one of said casings for controlling the operation of said valve, an air supply pipe leading to said furnace, a valve in said air pipe, a thermostatic element in the other casing for controlling said air supply valve, valves for respectively controlling said openings in the casings, means for varying the positions of said valves with respect to said openings, and means operating in conjunction with said valves for indicating the position of said valves with respect to said openings.

4. In a device of the character stated, a furnace combined with a plurality of casings each having communication with the furnace to provide for a circulation of a portion of the heated products through said casings each of said casings being provided with an opening adjacent the furnace end thereof, a fuel supply pipe leading to said furnace, a valve in said fuel supply pipe, a thermostatic element in one of said casings for controlling the operation of said valve, an air supply pipe leading to said furnace, a valve in said air pipe, a thermostatic element in the other casing for controlling said air supply valve, valves for respectively controlling said openings in the casings, and manually controlled means common to both of said valves for varying the positions of said valves with respect to said openings.

5. In a device of the character stated, a furnace combined with a plurality of casings each having communication with the furnace to provide for a circulation of a portion of the heated products through said casings, a fuel supply pipe leading to said furnace, a valve in said fuel supply pipe, a thermostatic element in one of said casings for controlling the operation of said valve, an air supply pipe leading to said furnace, a valve in said air pipe, a thermostatic element in the other casing for controlling said air supply valve, each of said casings being provided with openings adjacent the furnace end thereof, valves for respectively controlling said openings in the casings, a plurality of rack bars slidably mounted on said casings, valve members carried respectively by said rack bars and adapted to control the respective openings, and means for varying the positions of said rack bars whereby said valves may control the passage of the heated products through said openings to a greater or less extent.

6. In a device of the character stated, a furnace combined with a plurality of casings each having communication with heated products of the furnace to provide for a circulation of a portion of the heated products through said casings, a fuel supply pipe leading to said furnace, a valve in said fuel supply pipe, a thermostatic element in one of said casings for controlling the operation of said valve, an air supply pipe leading to said furnace, a valve in said air pipe, a thermostatic element in the other casing for controlling said air supply valve, and manually controlled means for varying the temperature of the products passing through the respective casings irrespective of the temperature of the furnace, whereby a predetermined temperature in the furnace may be maintained.

In testimony of which invention, I hereunto set my hand.

HARRY E. GILBERT.

Witnesses:
C. H. WISSMANN,
FLORENCE DEACON.